United States Patent Office 3,090,696
Patented May 21, 1963

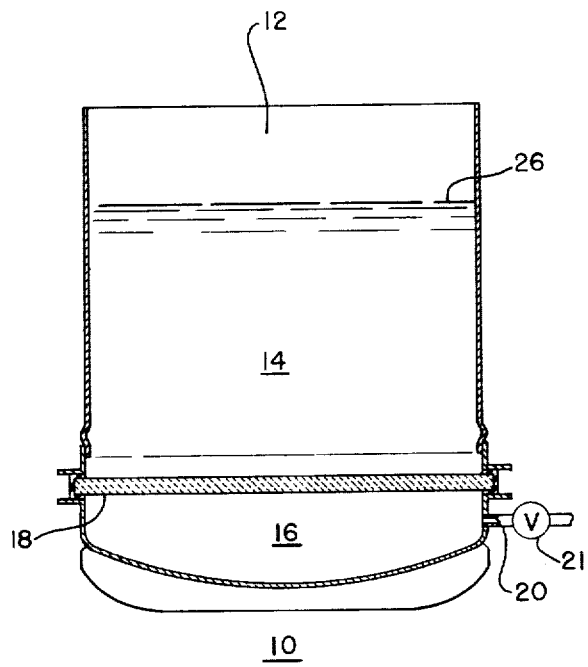

3,090,696
FLUIDIZED BED COATING PROCESS FOR COATING WITH THERMOSETTING MATERIALS
Erwin Gemmer, Frankfurt am Main, Germany, assignor to Knapsack-Griesheim Aktiengesellschaft, Knapsack, near Cologne, Germany, a company of Germany
Filed Sept. 10, 1956, Ser. No. 608,726
Claims priority, application Germany Dec. 11, 1954
5 Claims. (Cl. 117—21)

The present invention relates to protective coatings and to a method and means for applying such coatings. More particularly, the invention is concerned with a process for applying coatings from a complete coating composition in the form of a free-flowing powder.

This is continuation-in-part of U.S. patent application Serial No. 551,943, filed December 8, 1955, now abandoned.

An important object of the present invention is the production of coatings which are particularly suitable for protecting the surfaces of articles which are to be exposed to normally destructive solvents, chemicals or corrosive agents or which must be electrically insulated or which must resist mechanical abrasive or frictional wear. Some of the materials from which the articles to be coated may be made include the various metals such as steel, iron, aluminum, magnesium, copper, zinc, as well as the alloys thereof, and may also include a variety of non-metallic materials such as glass, ceramics, wood and the like.

Materials which possess superior resistance to chemicals and solvents or which are electrical insulators or which are resistant to mechanical abrasive or frictional wear often are quite expensive and do not possess sufficient mechanical strength and rigidity for use other than as coatings in mechanical structures. Also, the very resistance to solvents and other chemicals for which these materials may be valued sometimes makes them difficult to use in the production of coatings by presently known methods, such as by painting or spraying in a liquid solvent or liquid dispersion form. Also, the solvents may be very expensive and they may attack the surface of the article being coated so as to cause damage which impairs the adherence of the coating.

Accordingly, it is another important object of the present invention to provide a new and improved process for the production of superior coatings without the necessity of using liquid solvents or dispersing agents for the coating materials.

Another important object of the present invention is to provide an improved process and apparatus which is particularly suited for coating articles of irregular and complex shapes. Such articles may include, for instance, wrenches, hammers, pliers, bolts, pins, tubular sleeves, hooks or clamps. They may also include plating racks, anode hangers, electric wire and cable, ventilators, gears, pump housings, sieves, screens, switches, electrical fittings, tanks and vessels, protective caps, bushings, bellows, fan blades and guards, parts for domestic appliances and innumerable other articles of greater or lesser complexity of shape.

Another object of this invention is to provide a more economical process for the production of coatings having good decorative appeal.

Other objects and advantages of the invention will be apparent from the following specification.

This invention is particularly valuable for and applicable to the production of coatings from organic thermosetting polymers. Thermosetting polymers are generally those which require some type of curing or hardening in order to obtain the hardness, elasticity or other desired characteristics, and are distinguished from thermoplastic materials in that once the thermosetting polymers have taken shape in a cured state, they cannot be formed by simple melting and remolding. Examples of these polymers include certain materials which may be selected from the following general classes of thermosetting resins such as the phenol-formaldehyde resins, the urea-formaldehyde resins, the alkyd resins, the melamine-formaldehyde resins, the unsaturated polyesters, the silicone resins, the epoxy resins and the polyester rubbers. The term "thermosetting polymers" is not restricted to resins, however, and is herein meant to include any polymeric material having similar characteristics.

The curing of these materials takes place under a variety of circumstances and through a number of different mechanisms. The phenol-formaldehyde and the urea-formaldehyde resins, for example, usually require the presence of proper catalysts, together with high temperatures, to bring about curing within a reasonable length of time. Similarly, the epoxy resins require the addition of a curing agent such as certain amines or acids for proper curing. In the case of the epoxy resins, curing may take place either at room temperatures or at an elevated temperature in a curing oven.

The other thermosetting polymers mentioned above have similar requirements connected with the curing of each, and these requirements are generally well known in the art.

Each of the protective thermosetting polymer coating materials employed in this invention preferably has a decomposition point which is reasonably higher than its melting point (prior to curing or setting), and a melting point which is lower than the melting or decomposition point of the material from which the particular articles to be coated are made.

It may be desirable in some instances to include with the thermosetting coating material a substance which has a melting point substantially above the melting point of the coating material. In this case the coating mixture acts somewhat as a binder and the high melting materials as fillers. It may be desirable, for example, to impart abrasive characteristics to the coating, in which case abrasive fillers may be employed. Other suitable filling materials include powdered asbestos, slate, metal powders, heat-stable powdered pigment materials and the like.

In place of the high-melting fillers above mentioned, it has also been found that thermoplastic materials in the form of free-flowing powders can be combined with the thermosetting polymers to provide coatings having desirable characteristics. This may be accomplished by applying the coating of each material to an object separately and allowing the mixing to take place while the resins are in the fused state, or by conducting the coating process with an intimate mixture of the two types of polymer. In the first case, a thermosetting resin may be employed as an undercoating while a thermoplastic material may be used as the final coat. Examples of the use of thermoplastic materials in combination with the thermosetting polymers include the application of powders containing a phenolic resin and cellulose acetate butyrate. Where mixtures such as this are employed, it is generally desirable that at least 10 percent of the mixture be a thermosetting resin in order that the advantages of a thermosetting resin be obtained.

The thermosetting coating resin should be a solid and preferably pulverulent, in order that it may be readily fluidized, as explained below. In addition, it should be capable of being mixed with a pulverulent filler or other additive without appreciable packing or cohesion of the particles into larger aggregates. It is also generally desirable that the particle size and density of the coating material and of any additive thereto be sufficiently similar to prevent separation by classification during the fluidizing process.

In carrying out a preferred form of the coating process of this invention, the thermosetting polymer, preferably in the form of pulverulent particles, is transformed into a continuously fluidized bed by introducing at least one current of gas under pressure therein, the bed being maintained in the fluidized state by controlling the flow of the gas. The article to be coated is preheated and is then at least partially immersed in the fluidized bed of the coating material. Preferably, the article should be kept in motion and the immersion period should be relatively short. Individual particles of the coating material adhere and melt or fuse together with other particles on the hot surface of the immersed portion of the article, to form a continuous coating thereon. The article is maintained at a sufficient temperature for a sufficient time to obtain the desired degree of thermosetting properies.

The advanges of this invention are particularly apparent where one wishes to coat an article with an epoxy-type of thermosetting resin. These resins are generally formed by the reaction of a bisphenol with epichlorohydrin. The varying types of epoxy resins are described in terms of their melting point, epoxide equivalent and equivalent weight. The epoxide equivalent is defined as the number of grams of resin containing one gram equivalent of epoxide. The equivalent weight is defined as the number of grams of resin required to esterify completely one gram mole of monobasic acid such as, for example, 60 grams of acetic acid.

Where, in the past, these epoxy resins have been used by manufacturers as coating ingredients, the resins have been either esterified at the free hydroxyl groups with unsaturated fatty acids, to give a synthetic drying oil, or have been dissolved in suitable solvents and mixed with modifiers which react with the hydroxyl and epoxide groups at elevated temperatures to form baking finishes.

A recently introduced method of employing epoxy finishes comprises the use of a polyamide resin with the epoxide resin to form epoxy resins which will cure at room temperature. The polyamide resin generally employed as a cross-linking polymer or curing agent is similar to the nylons but is characterized by a lower molecular weight. In addition, the carboxyl groups of the cross-linking polyamide resin are separated by a greater number of carbon atoms than are the carboxyl groups of the nylons. Also, it is important that the polyamide employed as a curing agent contain a number of active amine groups.

This invention, however, is not restricted to the use of epoxy resins with polyamide resins, but other cross-linking agents such as dicyandiamide, ethylene diamine or diethylene diamine may be employed.

Where a mixture of thermosetting epoxy resin and curing agent powders is employed according to the process of this invention, it is believed that some degree of cross-linking occurs immediately after the two components of the dry powder have fused together on the heated surface of the article being coated. When certain cross-linking polyamides are employed, an immediate cooling of the article, followed by a period of storage at room temperature, will provide a sufficient curing of the coating. In other instances, it has been found desirable to subject the epoxy coating to curing in a heating oven.

In preparing other types of thermosetting polymers for use according to this invention, it is generally sufficient to follow the teachings of the prior art. For example, where it is desired to provide a coating of a melamine-formaldehyde resin, the resin may be prepared by reacting melamine with formaldehyde under slightly alkaline conditions in the molar ratio of 2:1. After reaction in aqueous solution, the resin may be recovered by vacuum concentration and its degree of polymerization advanced by heat treatment to convert the resin to a grindable solid at room temperature. The resulting powder may then be applied according to the process of this invention, and any additional curing required may be provided under any conditions necessary.

The invention is not limited to the use of a fluidized bed comprising a powder alone, but may also comprise a powder which has previously been allowed to adsorb a liquid additive. An example of where such a liquid additive may be useful is found where one wishes to modify an epoxy resin coating by using a liquid polysulphide polymer. The liquid polysulphide polymer has been found particularly advantageous in improving the flexibility and toughness of the epoxy resin coatings. The polysulphide liquid polymers are mercaptan-terminated saturated elastomeric chains prepared from bis(2-chloroethyl)-formal and cross-linked with trichloropropane, represented by

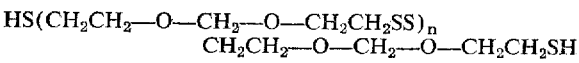

where $n$ may vary from 2 to 26.

The polysulphide liquid polymers are known to co-react with the epoxy resins to form block polymers of the form $—A—B_x—A—B_{x'}—A—B_{x''}$, where A represents the polysulphide polymer, B the epoxy resin and the subscripts $x$, $x'$, $x''$, etc. may be 1, 2, 3, etc.

It is obvious that other combinations of dry powder constituents together with liquid or gaseous materials adsorbed into the dry powder may be employed. In such cases, the dry powder may be an inert fusible vehicle for the thermosetting material or it may constitute a thermosetting constituent. The main requirement, whether or not there is a liquid constituent present within the powder particles, is that the powder must remain free-flowing for the operation of the process of this invention.

Preferred apparatus for carrying out the process of this invention is described in my issued German Patent No. 933,019 and in my copending United States patent application Serial No. 551,943. A simple and basic form of this preferred apparatus is shown in a schematic cross-sectional view in the accompanying drawing. This apparatus includes a container 10 which may be constructed of a convenient structural material such as steel, for instance, and which has an open top as indicated at 12. The container 10 is divided into an upper chamber 14 in which the pulverulent coating material is confined and a pressure chamber 16 by a gas-pervious partition 18. This partition, which should be pervious to the gas used but impervious to the particles of coating material, may preferably take the form of a porous ceramic plate, although other similar structures may be advantageously used. A porous plate structure which is preferred is composed of an Alundum refractory material composed of fused alumina grains bonded together with an aluminous glass at a high firing temperature. Whether composed of this or other materials, the porous plate preferably has a gas permeability which may be defined as that which will permit the passage of from one to fifteen cubic feet of air at 70° F. and 25 percent relative humidity through an area of one square foot and a plate thickness of one inch at a pressure differential equivalent to two inches of water in a period of one minute. The average pore diameter of the porous plate should preferably be in a range from 0.003 to 0.004 of an inch or less.

The container 10 is provided with a gas inlet opening 20 which is adapted for connection through a shut-off valve 21 to a suitable source of gas under pressure in order to pressurize the pressure chamber 16. The source of gas under pressure is not shown since it may consist of any conventional source such as a steel "bottle" of precompressed gas or, if air is to be used, a conventional air compressor and accumulation tank may be used. When air is to be used, it is also possible to attach an air blower or pump directly to the inlet connection 20.

In the practice of the process of this invention, a quantity of very finely divided coating material is placed in the upper chamber 14 of the container 10 and gas under pressure is admitted through the connection 20 into the pressure chamber 16. The gas from the lower chamber 16 passes through the gas-pervious partition 18 and flows upwardly through many finely divided streams or in what might be characterized as a parallel upward flow from the entire upper surface of the partition 18 through the finely divided or pulverulent coating material. This upwardly moving gas causes the formation of a fluidized bed which is a combination of the solid particles of coating material and the fluidizing gas and which appears and feels much like a liquid.

In the process of this invention the coating is initially applied in a manner substantially similar to that set forth in my copending United States application Serial No. 551,- 943. The fluidizing medium is preferably any reasonably inert gas, and air is usually satisfactory and preferred. The rate of gas flow required in order to maintain a satisfactory fluidized bed is largely dependent upon the size, configuration and design of the apparatus employed. Additional considerations in this regard are fully set forth in my above-mentioned copending application.

The coating material preferably has a particle size of between 0.001 and about 0.024 inch. Best results have been obtained with a particle size of between 0.002 and about 0.012 inch.

Similarly, the period of immersion of the preheated article in the fluidized bed may vary over a relatively wide range, depending upon the thickness of the coating desired, the type of coating employed and the size and shape of the article being coated. In this respect, also, additional considerations are set forth in my above-identified copending application.

The foregoing applies to the methods which can be used to insure complete melting and coalescence of the coating materials on the surface of the article. Where the heat used in applying the coating plus subsequent room temperature storage is insufficient to obtain the desired thermosetting properties, the coated article may be subjected to further treatment at an elevated temperature for the required period of time. Where, for example, a phenol-formaldehyde resin or urea-formaldehyde resin is employed, additional treatment with heat may be required in order to obtain a coating having the desired characteristics.

In other instances, the latent heat in the article will be sufficient to impart a satisfactory degree of curing to the coating. Coatings of epoxy resins with certain polyamide curing agents, for example, are hard and tough when prepared according to the process of this invention, even though no additional heat treatment is provided. It may be necessary, however, to store the coated article for a week or two prior to use at temperatures at least as high as usual room temperatures in order that the curing process may be complete.

The coating is preferably allowed to cool slowly in order to promote the cure and thermosetting properties. It will be appreciated, however, that for some coating materials it may be preferable and more economical to cool the coatings rapidly, as by quenching in water. It may also be desirable with some materials, particularly where slow cooling is employed, to exclude oxygen during the cooling step in order to avoid excessive oxidation of the coating material. The resultant coating is smooth, coherent, has good adhesion and is free from pores.

It is sometimes desirable, in order to promote adhesion of the coating to the surface of the article, to clean and roughen the surfaces thereof as, for example, by means of sand or metal grit blasting or acid etching. Other known surface preparation and cleaning procedures also may be advantageously employed.

The process of this invention is particularly advantageous in that a wide range of coating thicknesses may be readily provided. Some thermosetting resin materials characteristically produce very thin coatings when applied in a solvent solution. For example, various resin varnishes must be applied as a series of coatings, and each coat must be followed by a baking or curing step. This is necessitated largely because of the difficulty of preparing solvent solutions of a workable viscosity which have, at the same time, a sufficiently high concentration of thermosetting resin to provide a coating of suitable thickness when the solvent has evaporated. According to the present process, this disadvantage is overcome in that the limitations obtaining when a solvent is employed do not exist. According to the present invention, it is possible to coat an article in one sequence with a coating of thermosetting resin of considerable thickness, the main considerations in control of the thickness being the preheating temperature of the article, the time of immersion, the melt viscosity of the molten coating, and, to some extent, the particle size of the coating material.

It is also possible, of course, to produce thin coatings in one sequence by the present process. For example, excellent coatings of silicone resin may be provided which are uniform, continuous and durable but which have a thickness of only 0.002 inch.

The best preheating temperature for coating in accordance with the process of this invention is very largely dependent upon the size, shape, thickness and heat-storage capacity of the article to be coated. If the article is small and therefore has a low heat-storage capacity, at a low preheat temperature the heat-storage in the article will be insufficient for the purpose of melting and causing adherence of a sufficient amount of the coating material to provide a satisfactory coating. On the other hand, if the article is relatively large or has a thick cross-section so that the heat-storage capacity is high, if the article is heated to a relatively high temperature the period of cooling of the article after coating will be unduly extended and excessive oxidation or degradation of the coating may result. It will be understood, of course, that with some thermosetting materials it may be desirable to have a long cooling period during which the material may "cure," as mentioned above.

Depending upon the size and heat capacity of the article to be coated, the thickness of the coating desired, the powdered coating material used and the temperature to which the article is preheated before coating, the best immersion time may vary from a fraction of a second up to several minutes.

As mentioned above, the process and apparatus of this invention are adapted for use with articles composed of many different materials and for the application of coatings of many different thermosetting polymers. The following examples are therefore set forth merely for the purpose of illustrating how the process may be used for various materials, without necessarily limiting the scope of the invention thereto.

*Example 1*

A cold rolled steel plate, the dimensions of which were 1" x 1/8" x 5", was coated with an epoxy resin. The procedure consisted of first preheating the workpiece in an oven at about 350° F. The preheated article was then immersed in a fluidized bed of a mixture of an epoxy resin and a curing agent. The epoxy resin was that designated as Epon 1001, manufactured by the Shell Chemical Corporation by the interaction of bisphenol A with epichlorohydrin. The melting point of this material ranges from 64 to 76° C. It has an epoxide equivalent of 450 to 525, and an equivalent weight of 1300. It was ground to a particle size of —70 mesh.

The curing agent employed in this mixture was dicyandiamide, which has a particle size of —100 mesh. The curing agent was present in the amount of 20 percent by weight of the mixture of resin and curing agent.

The fluidizing gas used was air at a pressure of about 4 atmospheres and at a temperature of about 68° F. The workpiece was dipped in the fluidized bed for about 4 seconds, after which the workpiece was placed in an oven at 350° F. for 15 minutes in order to cure the resulting coating. After curing, the coating was found to have a thickness of about .010 inch to .015 inch. The coating was slightly milky in color and had a hard, glossy surface.

*Example 2*

An aluminum rod, the dimensions of which were 2½" x ½", was preheated to 400° F. An epoxy resin designated Epon 1007, supplied by the Shell Chemical Corporation, was mixed with dicyandiamide and fluidized in the fluidization apparatus described above. The Epon 1007 has a melting point of from 127 to 133° C., an epoxide equivalent of 1550 to 2000 and equivalent weight of 190. This material had been ground to a particle size of —70 mesh. The dicyandiamide had a particle size of —100 mesh and was present in the mixture in the amount of 17 percent by weight.

The preheated aluminum rod was dipped in the fluidized bed for 4 to 6 seconds. It was then placed in a curing oven at 350° F. for 20 minutes. The resulting coating had a thickness of about .010 to .015 inch and was of extremely good quality. The surface was smooth, hard and glossy.

The fluidizing conditions were the same in this example as those employed in Example 1.

*Example 3*

An aluminum rod, the dimensions of which were 2½" x ½", was coated with an epoxy resin coating. The rod was preheated to 350° F. and immersed in a fluidized bed of epoxy resin and curing agent. The epoxy resin in this case was Epon 1009, also supplied by the Shell Chemical Corporation. The specifications of this material included a melting point range of from 145 to 155° C., an epoxide equivalent of 2400 to 4000, an equivalent weight of 200 and the material was ground to a particle size of —70 mesh. The dicyandiamide in this case had a particle size of —100 mesh and was present in the amount of 16 percent by weight of the total mixture.

The preheated rod was immersed in the fluidized bed for about 4 seconds and thereafter was cured in a curing oven for 20 minutes at 350° F.

The coating thickness obtained in this case was about .010 inch to .015 inch. The coating had a good appearance and withstood a reasonable amount of impact without breaking. A test with an electrical sparking device at 18,000 volts indicated no breakdown or gap in the coating. A solvency test showed a slow softening and apparently a dissolving of portions of the coating after one hour at room temperature in a mixture of equal parts of the following solvents: methyl isobutyl carbinol, methyl isobutyl ketone, toluene, and xylene.

*Example 4*

An aluminum rod 2½" x ½" in dimension was coated with an epoxy resin. The rod was preheated to 350° F. and immersed in a fluidized bed of epoxy resin and curing agent. The epoxy resin in this case was Epon 1004, manufactured by the Shell Chemical Corporation, and had a melting point of 95 to 105° C., an epoxide equivalent of 870 to 1025, an equivalent weight of 175 and a particle size of —70 mesh. The curing agent was dicyandiamide with a particle size of —100 mesh and was present in the mixture in the amount of 18 percent by weight. The aluminum rod was exposed to the fluidized bed for about 4 seconds and was thereafter removed and placed in a curing oven at 410° F. for 15 minutes.

The resulting coating in this case had a thickness from .010 inch to .015 inch and proved to be brittle under an impact test. Testing as in the previous example by means of an electrical spark showed no breakdown or gap in the coating. The solvency test as described in Example 3 showed a very slight softening of the coating after one hour.

*Example 5*

A cold rolled steel plate having the dimensions of 1" x ⅛" x 5" was coated with an epoxy resin containing aluminum oxide as a filler. The plate was preheated to a temperature of 375° F., and immersed in a fluidized bed containing 30 percent by weight of an epoxy resin and curing agent mixture and 70 percent by weight of a filler of aluminum oxide having a particle size of —180 mesh. The epoxy resin-curing agent mixture contained Epon 1001, having the specifications described in Example 1, and dicyandiamide, also having the specifications set forth in Example 1. The dicyandiamide in this case is present in the amount of 20 percent by weight of the epoxy resin mixture.

The preheated article was immersed in the fluidized bed for about 4 seconds. It was thereafter removed and placed in a curing oven at 350° F. for 15 minutes. The thickness of the coating was from .010 inch to .015 inch. In this case the coating had a rough emery-like appearance and, when tested for deburring characteristics, was shown to have considerable effect as an abrasive.

*Example 6*

An aluminum rod ½ inch in diameter and 2½ inches in length was coated with a silicone resin. The aluminum rod was preheated to 250° F. and then immersed in a fluidized bed of pulverulent silicone resin having a particle size of —40 mesh. The specific silicone resin employed is that sold by Dow-Corning Corporation, Midland, Michigan, under the designation R-5061 and has a specific gravity of 1.17, a melting point of 230° F. and a curing time of one hour at 480° F.

The aluminum rod was retained in the fluidized bed for from 1 to 2 seconds. In the curing procedure, the temperature was slowly raised from 250° F. to the curing temperature of 480° F. over a period of one hour, after which the temperature was maintained at 480° F. for one hour. The gradual temperature rise was necessary in order to prevent sagging and run-off by gradually promoting the cure and raising the melt viscosity.

The coating in this case had a thickness of .006 inch. It was hard and clear with a smooth finish and high gloss.

*Example 7*

An aluminum rod ½ inch in diameter and 2½ inches in length was coated with silicone resin. The aluminum rod was preheated to 250° F. and then immersed in a fluidized bed of pulverulent silicone resin having a particle size of —40 mesh. The specific silicone resin employed is that sold by Dow-Corning Corporation under the designation R-5071 and has a specific gravity of 1.17, a melting point of 230° F. and a curing time of one hour at 480° F.

The aluminum rod was retained in the fluidized bed for ¼ second and thereafter cured following the curing procedure outlined in Example 6.

The coating in this case had a thickness of .002 inch. The film produced had excellent adhesion characteristics and was hard, tough and clear.

Example 8

An aluminum rod ½ inch in diameter and 2½ inches in length was coated with a silicone resin. The aluminum rod was preheated to 250° F. and then immersed in a fluidized bed of pulverulent silicone resin having a particle size of —40 mesh. The specific silicone resin employed is that sold by Dow-Corning Corporation, Midland, Michigan, under the designation R–5071. This material has a specific gravity of 1.17, a melting point of 230° F. and a curing time of one hour at 480° F.

The aluminum rod was retained in the fluidized bed for from one to two seconds and thereafter cured following the curing procedure outlined in Example 6.

The coating in this case had a thickness of .006 inch. It was adherent, hard and clear with a smooth finish and high gloss, although it was slightly more brittle than the coating of Example 6.

Example 9

Aluminum rods having the dimensions of 2½″ x ½″ were coated with an epoxy resin. The aluminum rods were preheated to 350° F. and immersed in a fluidized bed with a pulverulent mixture of an epoxy resin and a polyamide. The epoxy resin employed was Epon 1007, having the specifications set forth in Example 2. The polyamide was that manufactured by General Mills Inc., Minneapolis, Minnesota, under the designation of No. 930. It is a condensation reaction product of a polymerized unsaturated fatty acid such as dilinoleic acid with aliphatic amines such as ethylene diamine. The molecular weight of this material is in the upper end of the range from 3000 to 10,000 and has a softening point in the range of 105 to 115° C. The polyamide was present in the fluidized mixture in the amount of 50 percent by weight and had a particle size of —70 mesh.

The aluminum rods were immersed in the fluidized bed for approximately 4 seconds. The rods were then removed. Thereafter they were placed in a curing oven at 275° F. for one hour. The coating after curing was found to have a thickness of from .010 inch to .015 inch. The aluminum rods were completely covered with the coating, although the coating was somewhat hard and brittle.

Example 10

An aluminum rod ½″ in diameter and 2½″ in length was coated with a single-stage thermosetting phenolic resin by preheating the rod to a temperature of 200° F. and dipping the rod into a fluidized bed of the powdered phenolic material for about 2 seconds. After the initial application of the coating, the temperature of the rod was gradually raised over a period of 10 minutes to a curing temperature of 350° F. The rod was then maintained at the curing temperature for a period of 15 minutes. The resultant coating appeared to have good strength, a glossy, natural finish and good adherence. The coating thickness was approximately 0.0010 of an inch.

The particular resin used in this example was a phenol-formaldehyde resin, commonly referred to as a phenolic, which is commercially available from Durez Plastics & Chemicals, Inc. under the product designation Durez 175 and has a specific gravity of 1.25, a melting point of 150.8° F., and a recommended curing temperature of 350° for 15 minutes.

Five hundred parts of this standard resin were modified by the addition of 10 parts of a finely divided chemically precipitated silica and 1 part of the silicone R–5071 available from Dow-Corning and described above in connection with Example 8.

Example 11

A copper plate 1 inch by 3 inches by ¼ inch having a slightly oxidized surface was preheated to a temperature of 675° F. and was then immersed for about 4 seconds in a fluidized bed containing about 90 percent, by weight, of high molecular weight polycaprolactam and about 10 percent of an epoxy resin formed as a reaction product of bisphenol A and epichlorohydrin. The particle size of the coating material was between about 0.002 inch and 0.006 inch. Prior to immersion in the fluidized bed, the copper plate was placed in an oven maintained at 1100° F. and permitted to remain there for about 20 minutes to obtain an acceleration in the formation of the slightly oxidized surface. The oxidized surface is important since it acts to provide a better bond of the coating on a copper article than a non-oxidized surface. The fluidizing gas was compressed air. After treatment in the fluidized bed, the coated article was subjected to heating for about 10 minutes in an oven maintained at about 500° F. The resultant coating had a thickness of about 0.20 inch and was rather rough. However, the adhesion and coverage of the coating was good.

The following claims are intended to define the valid scope of this invention over the prior art and to cover all changes and modifications falling within the true spirit and valid scope of the invention.

I claim:

1. The process of forming a coherent and adherent coating of thermosetting resin on the surface of an article comprising the steps of heating the surface of the article to a predetermined temperature below the melting temperature of the object, immersing the heated surface in a fluidized bed of free-flowing powder, said powder comprising at least 10% of a mixture of thermosetting resin and curing agent, maintaining said object in contact with said fluidized bed for a period of time sufficient to coat the article with the powdered mixture, removing said object from said bed, gradually raising the temperature of said surface from said predetermined temperature to an elevated temperature above said predetermined temperature, maintaining said elevated temperature of said surface for a time sufficient to cause some degree of reaction between the thermosetting resin and curing agent while the same are in a fused condition, and cooling the article to solidify the coating.

2. The process of forming a coherent and adherent layer of thermosetting resin on a surface of an object which comprises heating said surface to a predetermined temperature below the melting temperature of the object, forming a fluidized bed by passing a current of gas in a plurality of fine, parallel streams through a mixture of a solid pulverulent thermosetting epoxy resin and curing agent having particles therein with a softening temperature below said predetermined temperature, contacting said heated surface with said fluidized bed to deposit a layer of said particles on said heated surface, and thermally curing said layer.

3. The process of claim 2 wherein the curing agent is a polyamide of relatively low molecular weight, containing reactive amine groups.

4. The process of forming a coherent and adherent layer of thermosetting resin on the surface of an object which comprises heating said surface to a predetermined temperature below the melting point of the object, forming a fluidized bed by passing a current of gas in a plurality of fine parallel streams through a bed of solid pulverulent thermosetting phenolic resin, contacting said heated surface with said fluidized bed to deposit a layer of said particles on said heated surface, gradually raising the temperature of the heated surface from said predetermined temperature to a higher predetermined curing temperature and thermally curing said layer.

5. The process of forming a coherent and adherent layer of thermosetting resin on a surface of an object which comprises heating said surface to a predetermined temperature below the melting point of the object, forming a fluidized bed by passing a current of gas in a plurality of fine parallel streams through a mixture of a solid pulverulent thermosetting silicone resin having particles therein with a softening temperature below said predetermined temperature, contacting said heated surface with said fluidized bed to deposit a layer of said particles on said heated surface and thermally curing said layer.

References Cited in the file of this patent

UNITED STATES PATENTS

| | | |
|---|---|---|
| 2,657,974 | Cook | Nov. 3, 1953 |
| 2,719,093 | Voris | Sept. 27, 1955 |
| 2,728,122 | McLeer | Dec. 27, 1955 |
| 2,788,337 | Preiswerk | Apr. 9, 1957 |
| 2,824,078 | Mellick | Feb. 18, 1958 |
| 2,844,489 | Gemmer | July 22, 1958 |

FOREIGN PATENTS

| | | |
|---|---|---|
| 933,019 | Germany | Sept. 15, 1955 |
| 220,363 | Australia | Feb. 18, 1959 |

OTHER REFERENCES

Brooks, William: "The Future for Plural Component or Catalyst Resins," October 1959, "Metal Products Manufacturing," pages 34 and 35.

Gemmer: "Der heutige Stand des Kunststoffspritgens und Pulversinterns," Industrie-Anzeiger, 75 Jahragang, No. 12, Feb. 10, 1953, pp. 141–143.

UNITED STATES PATENT OFFICE
CERTIFICATE OF CORRECTION

Patent No. 3,090,696 May 21, 1963

Erwin Gemmer

It is hereby certified that error appears in the above numbered patent requiring correction and that the said Letters Patent should read as corrected below.

Column 3, line 35, for "advanages" read -- advantages --; column 7, line 7, for "1300" read -- 130 --; column 9, line 65, for "350° " read -- 350° F. --.

Signed and sealed this 22nd day of October 1963.

(SEAL)
Attest:

ERNEST W. SWIDER
Attesting Officer

EDWIN L. REYNOLDS

Acting Commissioner of Patents